(12) United States Patent
Toda et al.

(10) Patent No.: US 11,993,141 B2
(45) Date of Patent: May 28, 2024

(54) VEHICLE BODY STRUCTURE

(71) Applicant: MAZDA MOTOR CORPORATION, Hiroshima (JP)

(72) Inventors: Isao Toda, Hiroshima (JP); Takayuki Kimura, Hiroshima (JP); Takehiro Kamei, Hiroshima (JP); Hiroshi Tanaka, Hiroshima (JP); Haruo Ohe, Hiroshima (JP); Masaya Hiramatsu, Hiroshima (JP); Masanobu Fukushima, Hiroshima (JP); Takao Fukuda, Hiroshima (JP); Hironobu Hashiguchi, Hiroshima (JP); Hiroyuki Baba, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 164 days.

(21) Appl. No.: 17/585,233

(22) Filed: Jan. 26, 2022

(65) Prior Publication Data
US 2022/0314770 A1    Oct. 6, 2022

(30) Foreign Application Priority Data

Mar. 30, 2021    (JP) ................................ 2021-057930

(51) Int. Cl.
*B60K 1/04*    (2019.01)
*B62D 25/02*    (2006.01)
*B62D 25/20*    (2006.01)

(52) U.S. Cl.
CPC .............. *B60K 1/04* (2013.01); *B62D 25/025* (2013.01); *B62D 25/2009* (2013.01); *B60K 2001/0438* (2013.01)

(58) Field of Classification Search
CPC .......................... B60K 1/04; B60K 2001/0438; B62D 25/025; B62D 25/2009
See application file for complete search history.

(56) References Cited

U.S. PATENT DOCUMENTS

| 2015/0344081 A1* | 12/2015 | Kor .......................... B60K 6/40 |
| | | 180/2.2 |
| 2018/0111469 A1 | 4/2018 | Laimboeck et al. |
| 2019/0359046 A1* | 11/2019 | Tsuyuzaki ............... B60L 50/66 |

FOREIGN PATENT DOCUMENTS

| CN | 102938450 A | | 2/2013 | |
| CN | 112498497 A | * | 3/2021 | ............... B60K 1/04 |
| JP | H07-186734 A | | 7/1995 | |
| JP | 2008-155828 A | | 7/2008 | |
| JP | 2011-178289 A | | 9/2011 | |
| JP | 2018-114911 A | | 7/2018 | |
| JP | 2019-018686 A | | 2/2019 | |

OTHER PUBLICATIONS

The translation of Li (CN 112498497 A) relied upon in the office action is included for clarity of the record. (Year: 2021).*

* cited by examiner

*Primary Examiner* — James A Shriver, II
*Assistant Examiner* — Nicholas R. Kandas
(74) *Attorney, Agent, or Firm* — Studebaker & Brackett PC

(57) ABSTRACT

A vehicle structure includes side sills, pillars, a first battery arrangement portion provided inside the vicinity of the pillars in a vehicle width direction below a floor panel, and a second battery arrangement portion provided at a center portion in the vehicle width direction below the floor panel in a region inside an outer portion of the first battery arrangement portion in the vehicle width direction.

10 Claims, 10 Drawing Sheets

FRONT ⟷ REAR

VEHICLE BODY STRUCTURE

CROSS-REFERENCE TO RELATED APPLICATION

This application claims priority to Japanese Patent Application No. 2021-057930 filed on Mar. 30, 2021, the entire disclosure of which is incorporated by reference herein.

BACKGROUND

The present disclosure relates to a vehicle body structure including a floor panel, for example.

For example, in a motor vehicle having a traction motor, a battery unit for supplying electric power to the traction motor is mounted. Such a battery unit has a large capacity to extend the cruising range of the traction motor (e.g. see Japanese Unexamined Patent Publication No. 2019-18686). In the vehicle body structure of Japanese Unexamined Patent Publication No. 2019-18686, the battery unit is mounted below a floor panel extending horizontally from a front portion to a rear portion.

SUMMARY

In some cases, an obstacle collides with a motor vehicle from the side (lateral collision). Upon such lateral collision, a battery needs to be protected. Meanwhile, the cruising range largely depends on a battery capacity, and there has been a demand for increasing the capacity for mounting the battery. Increasing the capacity for mounting the battery means increasing the size of the battery. It is assumed that when the battery unit is mounted below the floor panel as in Japanese Unexamined Patent Publication No. 2019-18686, the battery unit is arranged to reach a portion close to a side sill.

If the battery is close to the side sill, an input load on the battery increases when the side sill is deformed inward upon lateral collision, which may lead to degradation of battery protection performance.

In view of the foregoing background, it is an object of the present disclosure to reduce an impact load input to batteries upon lateral collision while ensuring a great capacity for mounting the batteries.

To achieve the above-described object, a first aspect of the present disclosure may premise a vehicle body structure of a motor vehicle including a floor panel forming a floor surface of a vehicle interior, a traction motor, and batteries that supply electric power to the traction motor. The vehicle body structure includes a pair of right and left side sills arranged to extend in a front-rear direction at both end portions of the floor panel in a vehicle width direction, a pair of right and left pillars each extending upward from the pair of right and left side sills, a first battery arrangement portion provided inside the vicinity of the pillars in the vehicle width direction below the floor panel such that the batteries are arranged therein, and a second battery arrangement portion provided at a center portion in the vehicle width direction below the floor panel such that the batteries are arranged therein.

According to this configuration, the batteries can be mounted in both the first battery arrangement portion and the second battery arrangement portion. Thus, the capacity for mounting the batteries below the floor panel can be increased. In this case, the vicinity of the relatively highly-rigid pillars of the vehicle body is a portion having only a small amount of inward deformation in the vehicle width direction upon lateral collision, and the first battery arrangement portion is provided inside the vicinity of the pillars in the vehicle width direction. Thus, the impact load input to the batteries arranged in the first battery arrangement portion 51 is reduced. Further, since the second battery arrangement portion is provided away inward from the side sill in the vehicle width direction at the center portion in the vehicle width direction, a long distance in the vehicle width direction between the second battery arrangement portion and the side sill can be ensured. Thus, even if the side sill deforms inward in the vehicle width direction upon lateral collision, the impact load input to the batteries arranged in the second battery arrangement portion is reduced.

A second aspect of the present disclosure further includes a floor tunnel portion bulging upward at a center portion of the floor panel in the vehicle width direction. The second battery arrangement portion is provided inside the floor tunnel portion.

That is, since the floor tunnel portion is away from the side sill, the inside of the floor tunnel portion serves as the second battery arrangement portion so that the impact load input to the batteries arranged in the second battery arrangement portion can be reliably reduced.

In a third aspect of the present disclosure, the first battery arrangement portion is provided outside the floor tunnel portion in the vehicle width direction.

According to this configuration, the first battery arrangement portion can be provided across a wide area by means of a space outside the floor tunnel portion in the vehicle width direction. As a result, the capacity for mounting the batteries can be further increased.

In a fourth aspect of the present disclosure, the first battery arrangement portion includes first battery arrangement portions arranged on both sides in the vehicle width direction with respect to the second battery arrangement portion, and the second battery arrangement portion and the first battery arrangement portions on both sides in the vehicle width direction are provided continuously in the vehicle width direction.

According to this configuration, the batteries can be arranged on both sides and at the center portion in the vehicle width direction, and therefore, the capacity for mounting the batteries can be further increased.

A fifth aspect of the present disclosure further includes a battery case housing the batteries and fixed to at least either one of the floor panel or the side sills. The single battery case include one of the first battery arrangement portions on one side in the vehicle width direction, the second battery arrangement portion, and the first battery arrangement portion on the other side in the vehicle width direction.

According to this configuration, the battery case extending from one side to the other side in the vehicle width direction is fixed to at least either one of the floor panel or the side sills, and therefore, the rigidity of the vehicle body can be enhanced using the battery case.

In a sixth aspect of the present disclosure, the floor panel includes a front floor panel for placing a heel of a pedal operator operating a pedal provided at the motor vehicle, and a rear floor panel provided at the rear of the front floor panel. The front floor panel is positioned higher than the rear floor panel, and the first battery arrangement portion is provided below the front floor panel.

According to this configuration, the front floor panel for placing the heel of the pedal operator is positioned higher than the rear floor panel. Thus, the heel of the pedal operator is placed at a high position. This results in a small angle between a lower leg of the pedal operator and the front floor panel, which leads to small up-down component force input from the heel upon pedal operation. Thus, pedal operability is improved.

Moreover, the first battery arrangement portion is provided below the front floor panel arranged thereabove, and therefore, a space below the front floor panel can be effectively utilized without being a dead space. Thus, a battery with a great capacity can be mounted.

As described above, the vehicle structure includes the first battery arrangement portion provided inside the vicinity of the pillars in a vehicle width direction below the floor panel and the second battery arrangement portion provided at the center portion in the vehicle width direction below the floor panel in the region inside the outer portion of the first battery arrangement portion in the vehicle width direction. The impact load input to the batteries upon lateral collision can be reduced while a great capacity for mounting the batteries is ensured.

DETAILED DESCRIPTION

An embodiment of the present disclosure will be described in detail below with reference to the drawings. Note that the following description of the preferred embodiment is only an example in nature, and is not intended to limit the scope, applications or use of the present disclosure.

Figure 1:
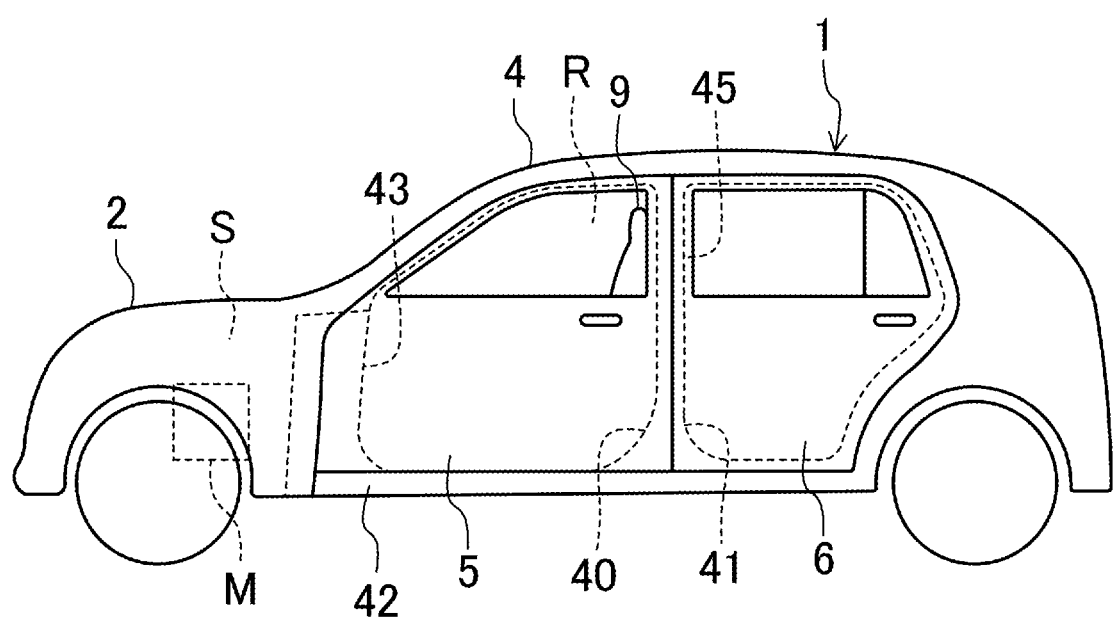
FIG. 1 is a side view of a motor vehicle of an embodiment of the present disclosure.

FIG. 1 is a left side view of a motor vehicle 1 of an embodiment of the present disclosure. The motor vehicle 1 is a so-called passenger car. Note that in the description of this embodiment, the front side of the vehicle is simply referred to as "front," the rear side of the vehicle is simply referred to as "rear," the right side of the vehicle is simply referred to as "right," and the left side of the vehicle is simply referred to as "left." A right-left direction of the vehicle is a vehicle width direction.

In a front portion of the motor vehicle 1, a power house S is provided. In the power house S, a power train (not shown) including a traction motor M etc. is stored. Thus, the power house S can also be referred to as, e.g., a power train storage compartment or a motor room. The motor vehicle 1 may be an electric motor vehicle or a hybrid motor vehicle (including a plug-in hybrid motor vehicle). In a case where the motor vehicle 1 is the electric motor vehicle, the traction motor M is mounted in the power house S. In a case where the motor vehicle 1 is the hybrid motor vehicle, the traction motor M and a not-shown internal combustion engine (an engine) are mounted in the power house S. Further, although not shown in the figure, the traction motor may be mounted at a rear portion of the motor vehicle 1, or may be an in-wheel motor mounted inside a wheel.

Provided above the power house S is a hood 2. The motor vehicle 1 may be such a front-engine rear-drive vehicle (hereinafter referred to as an FR vehicle) that an engine, a traction motor M, etc. mounted in a power house S drive rear wheels or such a front-engine front-drive vehicle (hereinafter referred to as an FF vehicle) that an engine, a traction motor M, etc. mounted in a power house S drive front wheels. In addition to the FR vehicle and FF vehicle, the motor vehicle may also be a 4-wheel drive vehicle that drives four wheels.

Figure 2:
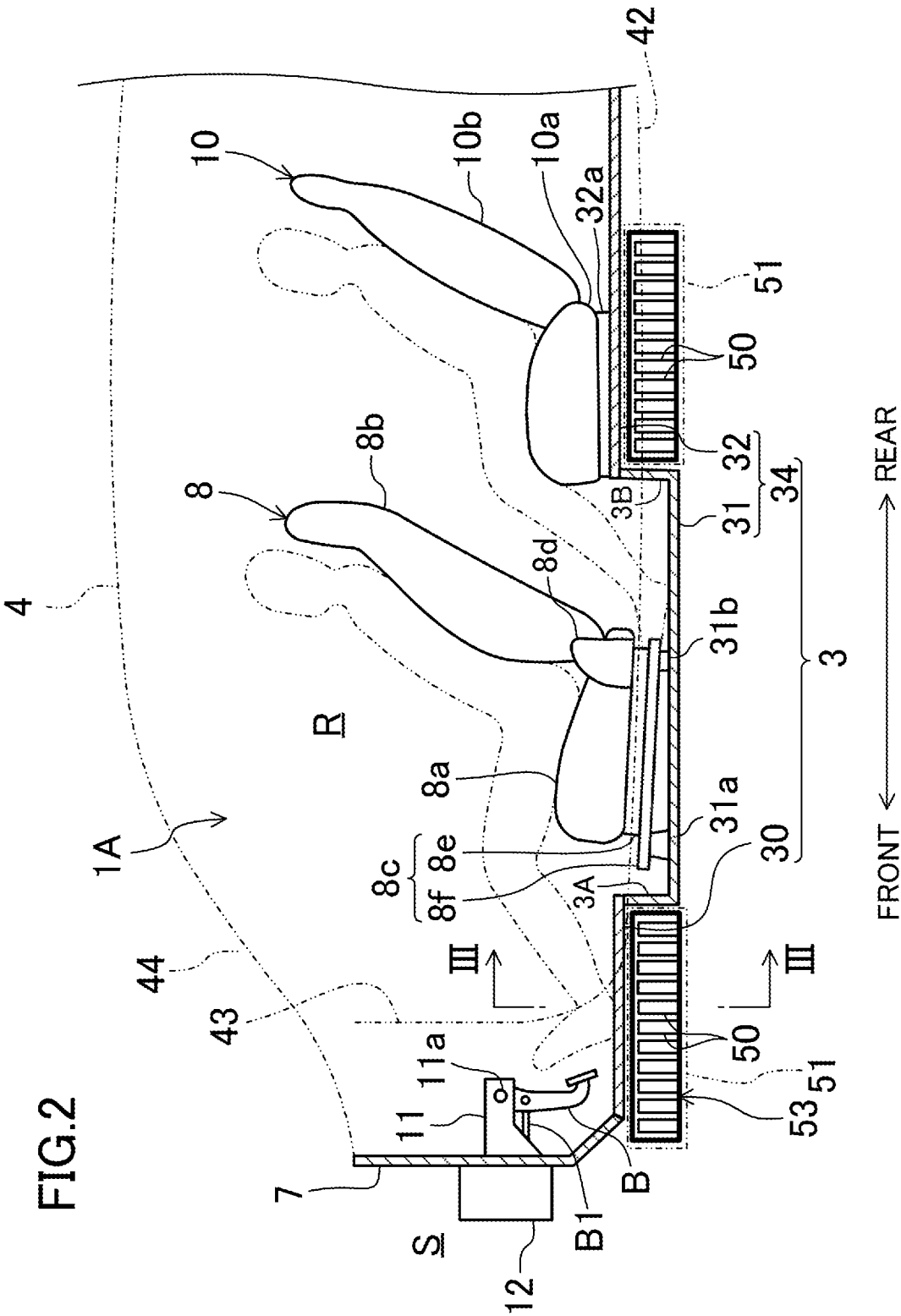
FIG. 2 is a partial cross-sectional view of a dash panel and a floor panel of the motor vehicle, FIG. 2 showing the position of a brake pedal.

In the motor vehicle 1, a vehicle interior R is provided at the rear of the power house S, as shown in FIG. 2. A bottom surface of the vehicle interior R is formed by a floor panel 3, and therefore, a space above the floor panel 3 is the vehicle interior R. A roof 4 is provided above the vehicle interior R. Further, as shown in FIG. 1, a front door 5 and a rear door 6 are arranged in an openable/closable manner at a left portion of the motor vehicle 1. Note that a front door and a rear door are also arranged in an openable/closable manner on the right side of the motor vehicle 1, although not shown in the figure.

As shown in FIG. 2, the motor vehicle 1 has a vehicle body structure 1A of the present disclosure. Although the vehicle body structure 1A includes the floor panel 3 and a dash panel 7, the dash panel 7 may be a member not forming the vehicle body structure 1A of the present disclosure. A member dividing the vehicle interior R and the power house S from each other in the front-rear direction is the dash panel 7. The dash panel 7 is made of, e.g., a steel plate, and extends not only in the right-left direction but also in the up-down direction. A lower portion of the dash panel 7 is inclined or curved so as to be positioned rearward toward a lower end portion thereof, and a lower end portion of the dash panel 7 is connected to a front end portion of the floor panel 3. Thus, the floor panel 3 is provided so as to extend rearward from the lower end portion of the dash panel 7.

In this embodiment, the right side of the vehicle interior R is a driver seat side, and the left side of the vehicle interior R is a passenger seat side. FIG. 2 is a cross-sectional view of the driver seat side of the motor vehicle 1, and shows the cross sections of the floor panel 3 and the dash panel 7 and a schematic structure of a driver seat 8 and a rear seat 10 attached to the floor panel 3 as well as a brake pedal B attached to the dash panel 7. While the driver seat 8 is provided on the right side of a center portion of the vehicle interior R in the right-left direction, a passenger seat 9 (shown in FIG. 1) is provided on the left side of the center portion of the vehicle interior R in the right-left direction. Note that the present disclosure is not limited to above, and the driver seat side may be on the left side of the vehicle interior R and the passenger seat side may be on the right side of the vehicle interior R. Further, there may be two or more rows of rear seats in the vehicle interior R.

Figure 3:
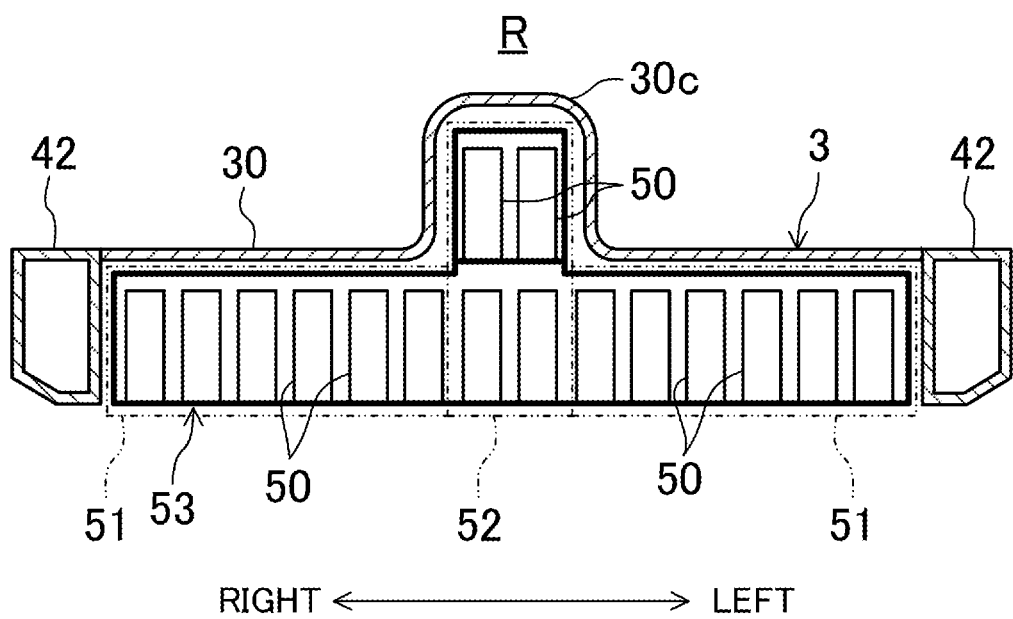
FIG. 3 is a cross-sectional view taken along line in FIG. 2.
Figure 4:
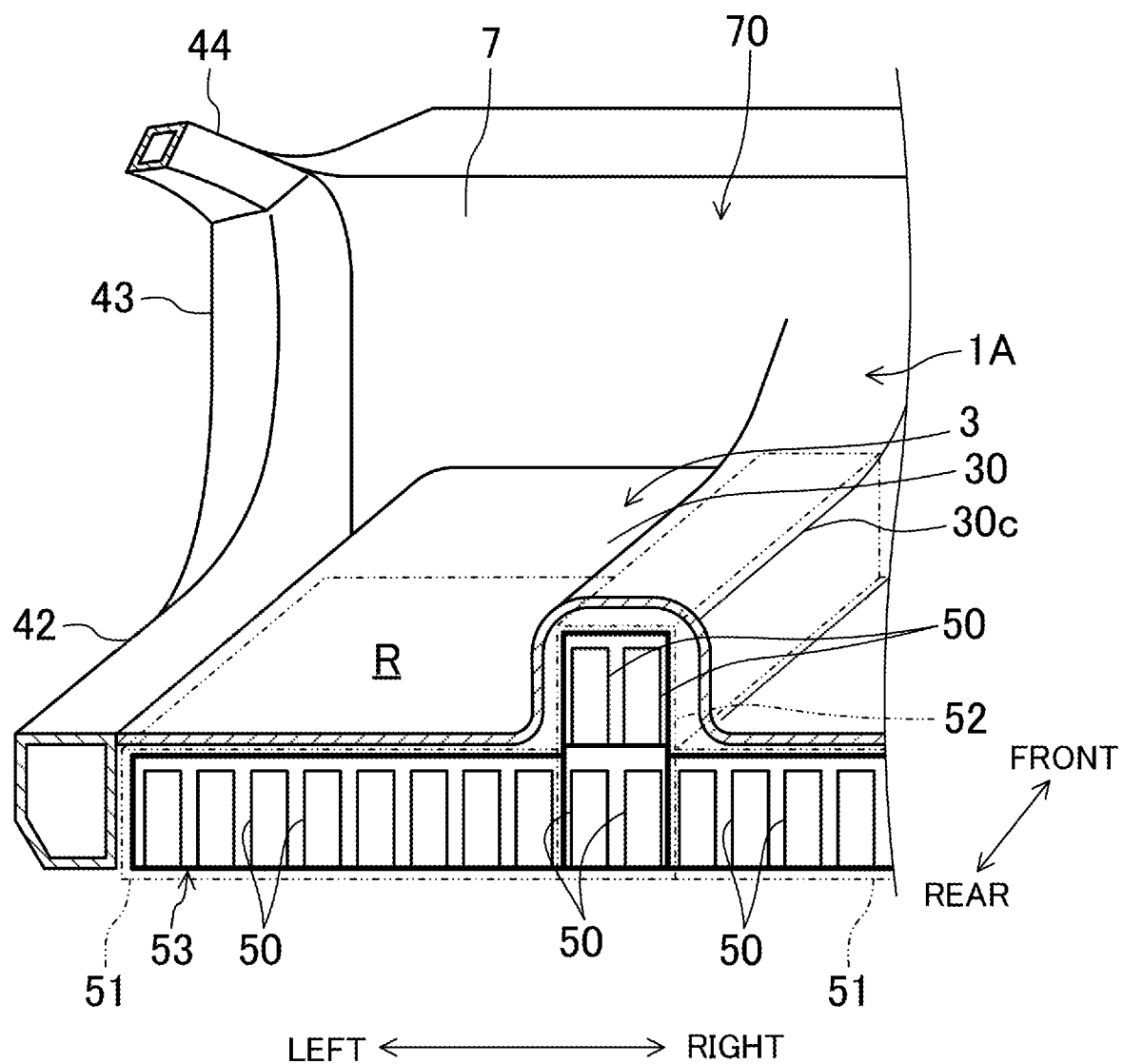
FIG. 4 is a perspective view of a front portion of a vehicle interior from the rear.

The vehicle body structure 1A of the motor vehicle 1 will be described more specifically. As indicated by broken lines in FIG. 1, at each of the right and left portions of the motor vehicle 1, there are a front door opening 40 to be opened or closed by the front door 5 and a rear door opening 41 to be opened or closed by the rear door 6. As shown in FIG. 3, the vehicle body structure 1A has a pair of right and left side sills 42 arranged so as to extend in the front-rear direction at both end portions of the floor panel 3 in the right-left direction. Further, as shown in FIG. 4, the vehicle body structure 1A also includes a pair of right and left hinge pillars 43 (only the left one is shown) arranged so as to extend in the up-down direction at both end portions of a front floor panel 30 forming a front portion of the floor panel 3. A lower portion of the hinge pillar 43 is connected to the vicinity of a front portion of the side sill 42, and the hinge pillar 43 extends upward from such a portion. A rear portion of the hinge pillar 43 is formed so as to be positioned rearward toward a lower portion of the hinge pillar 43. That is, the dimension of the hinge pillar 43 in the front-rear direction is set so as to be longer toward the lower portion of the hinge pillar 43. A lower end portion of the hinge pillar 43 extends to a position lower than a lower surface of the front floor panel 30 described later.

As shown in FIG. 4, a lower end portion of a front pillar 44 is connected to an upper portion of the hinge pillar 43. The front pillar 44 extends while being inclined so as to be positioned rearward toward the upper side, and is connected to a front portion of the roof 4. Further, as shown in FIG. 1, the vehicle body structure 1A includes a center pillar 45 extending upward from a middle portion of the side sill 42 in the front-rear direction. The front door opening 40 is formed by a rear edge portion of the hinge pillar 43, a lower edge portion of the front pillar 44, an upper edge portion of the side sill 42, a front edge portion of the center pillar 45, and the roof 4. The front door 5 is supported by the hinge pillar 43, and the rear door 6 is supported by the center pillar 45.

Further, the vehicle body structure 1A may include a rear pillar (not shown) that extends in the up-down direction at a portion away rearward from the center pillar 45. The rear door opening 41 is formed between the center pillar 45 and the rear pillar. The rear door 6 is omitted in some cases, and in these cases, the rear door opening 41 is also omitted.

As shown in FIG. 2, the brake pedal B is swingably provided at the dash panel 7. That is, in the vehicle interior R on the right side of the dash panel 7, a pedal bracket 11 is attached to a portion facing the driver seat 8. The pedal bracket 11 is provided away upward from an upper surface of the floor panel 3. A spindle 11a extending in the right-left direction is provided at the pedal bracket 11. An upper end portion of the brake pedal B is pivotably supported on the spindle 11a.

The brake pedal B extends downward from the portion supported by the spindle 11a. A lower end portion of the brake pedal B is a portion to be stepped on by an occupant. A rear end portion of a rod B1 is coupled to the brake pedal B. A front end portion of the rod B1 is connected to an input of a brake booster apparatus 12. Note that the front end portion of the rod B1 may be coupled to a brake force generation apparatus other than the brake booster apparatus 12.

Note that the support structure of the brake pedal B is not limited to one described above and the brake pedal B may be a so-called organ pedal type brake pedal although not shown in the figure. In this case, a lower portion of the brake pedal is swingably supported on the floor panel 3 through a spindle extending in the right-left direction.

Figure 5:
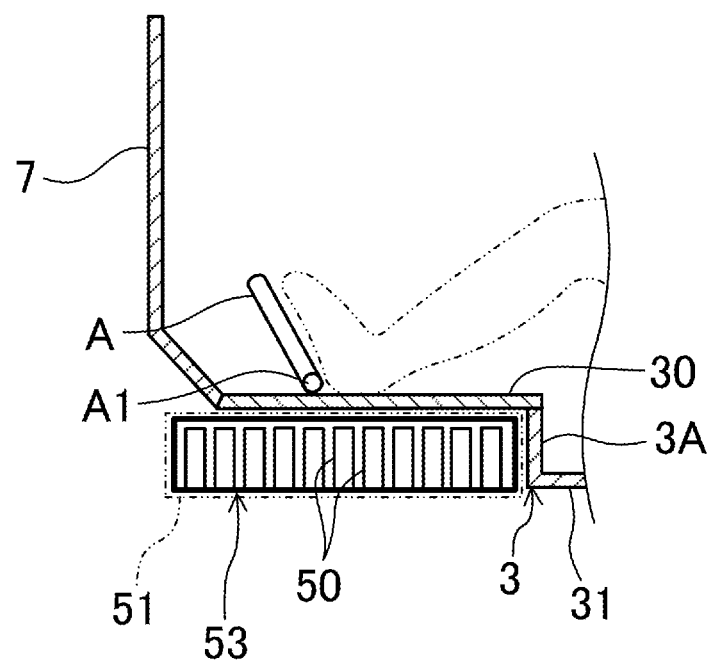
FIG. 5 is a partial cross-sectional view of the dash panel and the floor panel of the motor vehicle, FIG. 5 showing the position of an accelerator pedal.

FIG. 5 is a cross-sectional view of the dash panel 7 and the floor panel 3, and shows the position of an accelerator pedal A. The accelerator pedal A is of a so-called organ pedal type, and a lower portion of the accelerator pedal A is swingably supported to the floor panel 3 through a spindle A1 extending in the right-left direction. Note that although not shown in the figure, the accelerator pedal A may be of a hanging type. In this case, an upper portion of the accelerator pedal A is swingably supported on the dash panel 7 via the spindle extending in the right-left direction. The motor vehicle 1 driven by the traction motor also includes a pedal to be operated upon acceleration, and such a pedal will be also referred to as an accelerator pedal in the present specification.

Although not shown in the figure, in a case where a manual transmission, whose gear ratio is changed by an occupant using an operation lever (not shown) provided in the vehicle interior R, is mounted, a pedal for operating a clutch is provided in the vehicle interior R. Normally, the accelerator pedal A is arranged at the rightmost position, the brake pedal B is arranged at the left of the accelerator pedal A, and a clutch pedal is arranged at the left of the brake pedal B.

Further, for example, in an instruction vehicle used for a motor vehicle driving course, an accelerator pedal and a brake pedal are also provided on a passenger seat side as in a driver seat side, although not shown in the figure. The present disclosure is also applicable to such an instruction vehicle.

(Configuration of Floor Panel)

Figure 6:
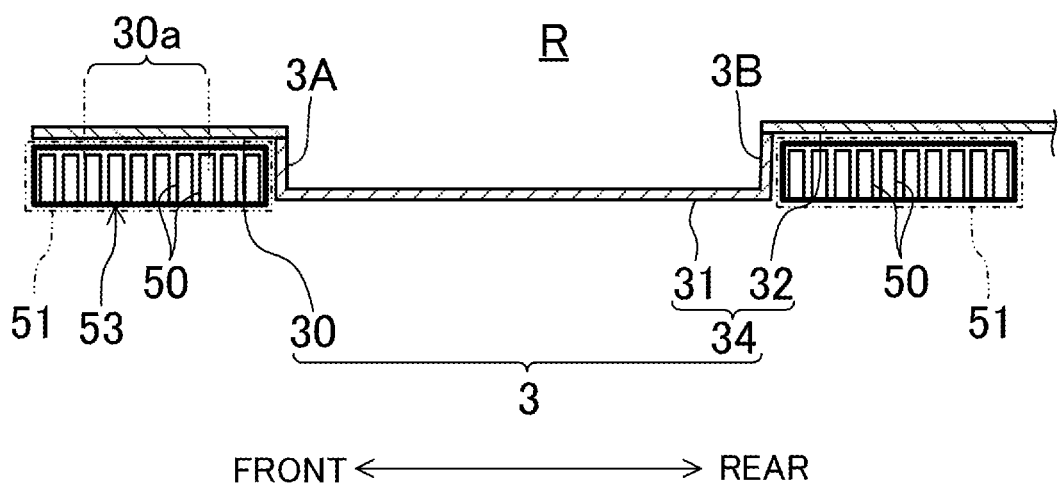
FIG. 6 is a cross-sectional view showing an exemplary structure of the floor panel.

As shown in FIG. 6, the floor panel 3 includes a front floor panel 30 and a seat-mounted floor panel 34. The front floor panel 30 and the seat-mounted floor panel 34 are formed by separate members, and are joined to each other to form the floor panel 3. Further, the seat-mounted floor panel 34 includes a first floor panel (a rear floor panel) 31 forming a front portion of the seat-mounted floor panel 34 and a second floor panel (a rear-seat floor panel) 32 forming a rear portion of the seat-mounted floor panel 34. The first floor panel 31 and the second floor panel 32 are separate members, and are joined to each other to form the seat-mounted floor panel 34.

As shown in FIGS. 3 and 4, a floor tunnel portion 30c is formed at the front floor panel 30 and the first floor panel 31. The floor tunnel portion 30c may be formed in such a manner that center portions of the front floor panel 30 and the first floor panel 31 in the right-left direction bulge upward, and for example, may be formed so as to continuously extend in the front-rear direction from the front portion of the front floor panel 30 to the rear portion of the first floor panel 31.

The front floor panel 30 extends rearward from the lower end portion of the dash panel 7, and extends in the right-left direction. A heel rest portion 30a on which a heel of the pedal operator operating the brake pedal B and the accelerator pedal A is placed is provided at the front floor panel 30. The heel rest portion 30a is a portion where the heel of the occupant is naturally placed when the occupant operates the accelerator pedal A or the brake pedal B. This portion varies to some extent according to the physique, driving postures, etc. of the occupant, but is generally an area (region) shown in FIG. 6. That is, the heel rest portion 30a can be defined as a continuous region from a portion away rearward from a front end portion of the front floor panel 30 to a portion away forward from a rear end portion of the front floor panel 30, and can also be a middle portion of the front floor panel 30 in the front-rear direction.

As shown in FIG. 2, the second floor panel 32 is a member provided away rearward from the front floor panel 30 and fixed to the rear seat 10. The rear seat 10 includes a rear-seat cushion portion 10a forming a seat surface and a rear-seat seat back portion 10b forming a back rest portion. The rear-seat cushion portion 10a is fixed to an upper surface of the second floor panel 32.

Although the second floor panel 32 is continuously formed at least from a portion corresponding to a front end portion to a portion corresponding to a rear end portion of the rear-seat cushion portion 10a, the second floor panel 32 may be further extended rearward beyond the rear end portion of the rear-seat cushion portion 10a. In this case, a rear seat of a second row or a luggage compartment for placing luggage can be provided at the rear of the rear seat 10.

The first floor panel 31 extends from a rear portion of the front floor panel 30 to a front portion of the second floor panel 32. The first floor panel 31 is positioned lower than the front floor panel 30. That is, for example, the front floor panel 30 can be formed so as to extend substantially horizontally in the front-rear direction, and the first floor panel 31 can also be formed so as to extend substantially horizontally in the front-rear direction. In this case, since the front floor panel 30 is in a position higher than the first floor panel 31, the floor panel 3 includes a front plate portion 3A extending in the up-down direction from the rear portion of the front floor panel 30 to the front portion of the first floor panel 31. Since the front floor panel 30 and the first floor panel 31 are connected to each other through the front plate portion 3A, there is a step between the front floor panel 30 and the first floor panel 31.

Further, the second floor panel 32 may also be in such a shape that the second floor panel 32 extends substantially horizontally in the front-rear direction. The second floor panel 32 is positioned higher than the first floor panel 31. Thus, the floor panel 3 includes a rear plate portion 3B extending in the up-down direction from the front portion of the second floor panel 32 to the rear portion of the first floor panel 31. Since the second floor panel 32 and the first floor panel 31 are connected to each other through the rear plate portion 3B, there is a step between the second floor panel 32 and the first floor panel 31. Thus, the first floor panel 31 is positioned one step lower than the front floor panel 30 and the second floor panel 32. A difference in a height between the first floor panel 31 and each of the front floor panel 30 and the second floor panel 32 may be set to 5 cm or more, 10 cm or more, or 15 cm or more, for example. The front floor panel 30 and the second floor panel 32 may be at the same height, or the front floor panel 30 may be lower or higher than the second floor panel 32. Further, the front floor panel 30, the first floor panel 31, and the second floor panel 32 are not necessarily precisely horizontal, and may be inclined so as to be positioned downward toward the rear side. Further, only part of the front floor panel 30, the first floor panel 31, and the second floor panel 32 may be inclined, and the remaining part may be substantially horizontal. Further, the second floor panel 32 may be at the same height as that of the first floor panel 31.

The front plate portion 3A may be integrally formed with the front floor panel 30 or with the first floor panel 31. Alternatively, the front plate portion 3A may be formed separately from these floor panels 30, 31. The rear plate portion 3B may be integrally formed with the second floor panel 32 or with the first floor panel 31. Alternatively, the front plate portion 3A may be formed separately from these floor panels 31, 32. Further, the front plate portion 3A and the rear plate portion 3B may extend substantially vertically, or may be inclined or curved. For example, the front plate portion 3A may be inclined or curved so as to be positioned rearward toward the lower side, and the rear plate portion 3B may be inclined or curved so as to be positioned forward toward the lower side.

As shown in FIG. 2, the first floor panel 31 includes a first front-seat fixing portion (front seat fixing portion) 31a and a second front-seat fixing portion (rear seat fixing portion) 31b for fixing the front seat 8. The first front-seat fixing portion 31a is provided at the front of a center portion of the first floor panel 31 in the front-rear direction, and for example, includes a member fixed to the first floor panel 31 and formed long in the right-left direction. Similarly, the second front-seat fixing portion 31b also includes a member formed long in the right-left direction, and is provided a predetermined distance away rearward from the first front-seat fixing portion 31a. The configurations of the first front-seat fixing portion 31a and the second front-seat fixing portion 31b are not limited to the members as described above, and may be members formed in various shapes by plate members etc. Note that in this embodiment, the first front-seat fixing portion 31a is formed so as to be higher than the second front-seat fixing portion 31b. However, the heights of the first front-seat fixing portion 31a and the second front-seat fixing portion 31b may be the same as each other.

A rear-seat fixing portion 32a for fixing the rear seat 10 is provided at least at a front portion of the second floor panel 32. The rear-seat fixing portion 32a may be configured similarly to or differently from the front-seat fixing portions 31a, 31b. In a case where the second floor panel 32 and the first floor panel 31 are arranged at the same height, the front seat 8 and the rear seat 10 can be arranged at the same height.

(Front Seat)

The front seat 8 includes a front-seat cushion portion 8a, a front-seat seat back portion 8b, and a seat slide mechanism 8c configured to adjust the position of the front-seat cushion portion 8a in the front-rear direction. The front-seat cushion portion 8a is a portion forming a seat surface for a front seat occupant, and although not shown in the figure, includes, e.g., a seat frame, a cushion material, and a cover material. The front-seat seat back portion 8b is a portion forming a back rest portion for the front seat occupant, and although not shown in the figure, includes, e.g., a seat frame, a cushion material, and a cover material.

A lower portion of the front-seat seat back portion 8b is attached to a rear portion of the front-seat cushion portion 8a through a reclining mechanism 8d. The reclining mechanism 8d is typically well-known, and is a mechanism for fixing the front-seat seat back portion 8b at an optional inclination angle.

The seat slide mechanism 8c may be a typically well-known mechanism, and for example, includes a movable member 8e fixed to a lower portion of the front-seat cushion portion 8a and a rail 8f fixed to the first front-seat fixing portion 31a and the second front-seat fixing portion 31b on the first floor panel 31. The rail 8f is a member for guiding the front-seat cushion portion 8a in the front-rear direction, and extends in the front-rear direction. A front portion of the rail 8f is fixed to the first front-seat fixing portion 31a, and a rear portion of the rail 8f is fixed to the second front-seat fixing portion 31b. Since the first front-seat fixing portion 31a is higher than the second front-seat fixing portion 31b, the rail 8f is inclined so as to be positioned upward toward the front. The rail 8f may be substantially horizontal.

The movable member 8e is a member capable of moving relative to the rail 8f in the front-rear direction while being engaged with the rail 8f. The position of the movable member 8e with respect to the rail 8f in the front-rear direction can be an optional position within a predetermined range, and the movable member 8e can be locked to the rail 8f at such a position. Such a lock mechanism is also typically well-known, and for example, can be unlocked by, e.g., lever operation. Note that the seat slide mechanism 8c and the reclining mechanism 8d may be of an electric type using an electric motor.

Further, the height of the seat slide mechanism 8c can be set according to the height of the first floor panel 31, the height of the first front-seat fixing portion 31a, and the height of the second front-seat fixing portion 31b. In this embodiment, the height of the seat slide mechanism 8c is set such that the front floor panel 30 is at a position higher than the seat slide mechanism 8c when compared with the front floor panel 30.

(Battery)

As shown in FIG. 2, the motor vehicle 1 includes a plurality of batteries 50 that supply electric power to the traction motor M. In this embodiment, each battery 50 is a so-called battery cell, and may be a lithium-ion battery, an all-solid-state battery, or other secondary batteries, for example. Further, the battery 50 may be a battery pack housing a secondary battery.

For mounting the batteries 50, the vehicle body structure 1A has, as spaces for arranging the batteries 50 (battery arrangement spaces), first battery arrangement portions 51 and a second battery arrangement portion 52 below the floor panel 3. The first battery arrangement portions 51 are portions in which some of the plurality of batteries 50 are arranged, and the second battery arrangement portion 52 is a portion in which the remaining batteries 50 are arranged.

The first battery arrangement portions 51 and the second battery arrangement portion 52 will be specifically described with reference to FIGS. 3 and 4. In FIGS. 3 and 4, the sizes and shapes of the first battery arrangement portions 51 and the second battery arrangement portion 52 are schematically indicated by virtual lines. The sizes and shapes of these arrangement portions may be larger or smaller than those shown in the figures. The first battery arrangement portions 51 are provided below the front floor panel 30 on the driver seat side (on one side in the vehicle width direction) and on the passenger seat side (the other side in the vehicle width direction). The first battery arrangement portion 51 on the driver seat side is provided inside in the vehicle width direction in the vicinity of the right hinge pillar 43. The dimension of such a first battery arrangement portion 51 in the right-left direction is set so as not to reach a portion immediately below the floor tunnel portion 30c from the vicinity of the right hinge pillar 43. As shown in FIG. 2, a lower portion of the hinge pillar 43 and at least part of the first battery arrangement portion 51 are positioned so as to overlap with each other as viewed from the side.

The first battery arrangement portion 51 on the passenger seat side is provided inside in the vehicle width direction in the vicinity of the left hinge pillar 43. The dimension of such a first battery arrangement portion 51 in the right-left direction is set so as not to reach a portion immediately below the floor tunnel portion 30c from the vicinity of the left hinge pillar 43. At least part of the first battery arrangement portion 51 on the passenger seat side also overlaps with a lower portion of the hinge pillar 43 as viewed from the side.

The hinge pillar 43 is a highly-rigid member because the hinge pillar 43 supports the front door 5 in an openable/closable manner. A lower end portion of the hinge pillar 43 is positioned in the vicinity of the front floor panel 30. For example, when an impact load acts laterally from the motor vehicle 1 (e.g., upon lateral collision), the load is transmitted to the vehicle body through the highly-rigid hinge pillar 43. At this time, since the hinge pillar 43 and the batteries 50 arranged in the first battery arrangement portions 51 overlap with each other as viewed from the side, the batteries 50 can be protected by the hinge pillar 43 and the input load to the batteries 50 can be reduced.

A front portion of the first battery arrangement portion 51 is at the same position as that of the front portion of the front floor panel 30 or immediately below the dash panel 7. A rear portion of the first battery arrangement portion 51 is at the same position as that of the rear portion of the front floor panel 30 or in the vicinity of the front plate portion 3A.

The second battery arrangement portion 52 is provided between the first battery arrangement portion 51 on the driver seat side and the first battery arrangement portion 51 on the passenger seat side, i.e., at a center portion in the vehicle width direction below the floor panel 3. Since the floor tunnel portion 30c is formed at the center portion of the floor panel 3 in the vehicle width direction, the second battery arrangement portion 52 is arranged such that the position thereof in the vehicle width direction corresponds to the floor tunnel portion 30c. Further, a region corresponding to the floor tunnel portion 30c and positioned below the floor panel 3 is a region inside in the vehicle width direction with respect to outer portions of the first battery arrangement portions 51 in the vehicle width direction. In other words, the first battery arrangement portions 51 are arranged outside the floor tunnel portion 30c in the vehicle width direction.

Further, in this embodiment, a lower portion of the first battery arrangement portion 51 and a lower portion of the second battery arrangement portion 52 are set to the same height, but these portions may be at different heights. The second battery arrangement portion 52 is also arranged inside the floor tunnel portion 30c, and an upper portion of the second battery arrangement portion 52 is positioned in the vicinity of an upper portion of the floor tunnel portion 30c. As a result, the upper portion of the second battery arrangement portion 52 is positioned higher than the upper portions of the first battery arrangement portions 51. Thus, the dimension of the second battery arrangement portion 52 in the up-down direction is longer than the dimension of the first battery arrangement portion 51 in the up-down direction. Further, in the case of comparing the dimension in the vehicle width direction, the first battery arrangement portion 51 is longer than the second battery arrangement portion 52.

A relative positional relationship among the first battery arrangement portions 51 and the second battery arrangement portion 52, in other words, is that the first battery arrangement portions 51 are provided on both sides of the second battery arrangement portion 52 in the vehicle width direction. The first battery arrangement portion 51 on the driver seat side, the second battery arrangement portion 52, and the first battery arrangement portion 51 on the passenger seat side are continuous in the vehicle width direction.

As shown in FIG. 2, first battery arrangement portions 51 are also provided the driver seat side and the passenger seat side below the second floor panel 32. These first battery arrangement portions 51 on the rear side are similar to the first battery arrangement portions 51 on the front side. The second battery arrangement portion 52 is provided in the floor tunnel portion 30c so as to extend to a rear portion of the floor tunnel portion 30c. A rear portion of the second battery arrangement portion 52 reaches below the second floor panel 32, and is positioned between the rear first battery arrangement portions 51. Note that the rear first battery arrangement portions 51 may be provided as necessary and may be omitted.

Figure 7:
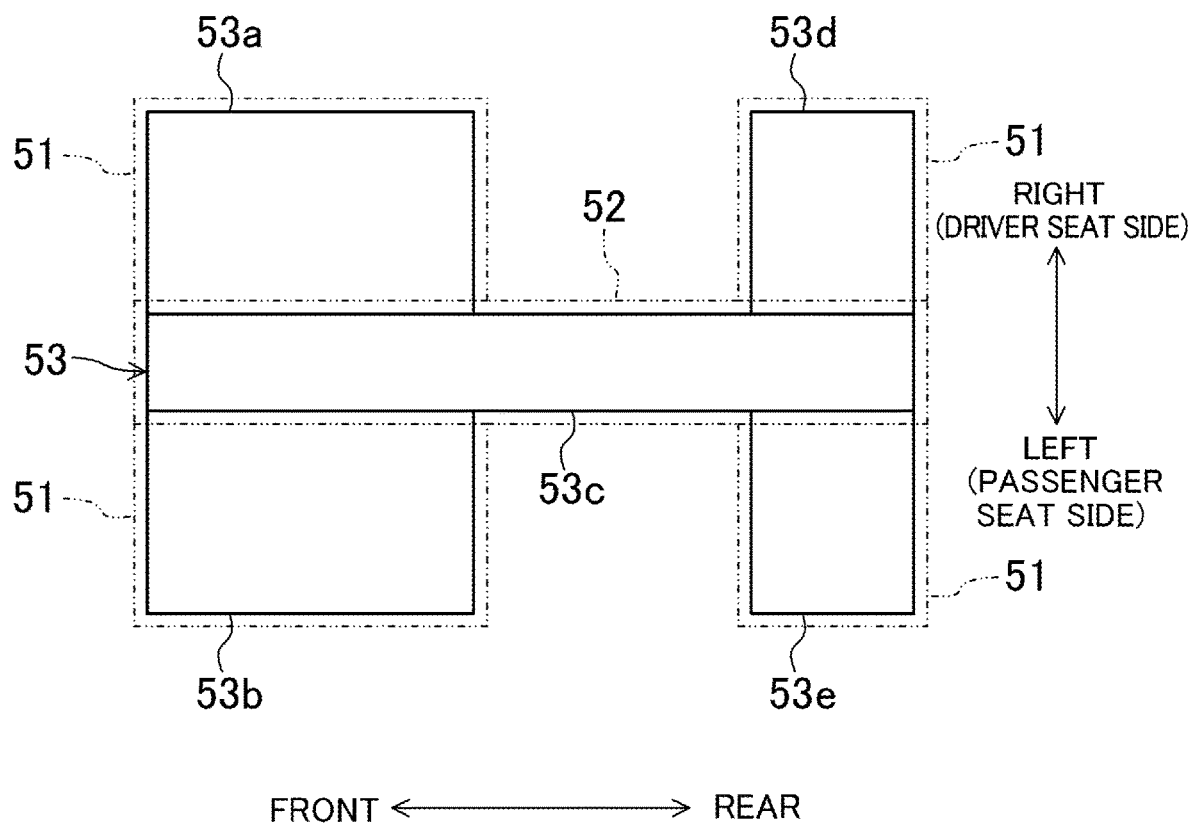
FIG. 7 is a plan view of a battery case.

The first battery arrangement portions 51 and the second battery arrangement portion 52 as described above are spaces for arranging the batteries 50. For arranging the batteries 50 in these arrangement spaces, there is a need for a battery holder for holding the batteries 50 at predetermined positions. As an example of the battery holder, a battery case 53 for housing the batteries 50 is used. Thus, the vehicle body structure 1A includes the battery case 53 having a shape as shown in FIG. 7. The battery case 53 is fixed to, e.g., at least one of the floor panel 3 or the side sill 42, and is integrated with the vehicle body. Examples of members forming the battery case 53 may include a steel plate and an extruded material, and these members form the single battery case 53. The term "single" means that the battery case 53 is one piece as a structure before fixed to the vehicle body and, even if the battery case 53 is dividable into a plurality of members, these members are integrated so as not to be separated immediately before these members are fixed to the vehicle body on a manufacturing line for the motor vehicle 1, for example. The batteries 50 and the battery case 53 may be collectively referred to as a battery unit, for example.

A reinforcement member etc. are provided inside or outside the battery case 53. With these members, the rigidity of the battery case 53 can be enhanced. By fixing the highly-rigid battery case 53 to the floor panel 3 or the side sill 42 as shown in FIGS. 3 and 4, the rigidity of the battery case 53 contributes to enhancement of the rigidity of the vehicle body. A fixing structure of the battery case 53 is not particularly limited. For example, a fixing structure using a fastening member such as a bolt, a nut, or a screw can be adopted.

As shown in FIG. 7, the battery case 53 includes a right front housing portion 53a corresponding to the first battery arrangement portion 51 on the driver seat side and the front side, a left front housing portion 53b corresponding to the first battery arrangement portion 51 on the passenger seat side and the front side, a center housing portion 53c corresponding to the second battery arrangement portion 52, a right rear housing portion 53d corresponding to the first battery arrangement portion 51 on the driver seat side and the rear side, and a left rear housing portion 53e corresponding to the first battery arrangement portion 51 on the passenger seat side and the rear side. The housing portions 53a, 53b, 53d, 53e may be each arranged within the first battery arrangement portions 51, or may have the same shape as that of the first battery arrangement portion 51. Further, the housing portion 53c may be arranged within the second battery arrangement portion 52, or may have the same shape as that of the second battery arrangement portion 52.

The first floor panel 31 (shown in FIG. 2) is positioned between the right front housing portion 53a and the right rear housing portion 53d and between the left front housing portion 53b and the left rear housing portion 53e. The right rear housing portion 53d and the left rear housing portion 53e may be omitted.

The right front housing portion 53a is formed so as to protrude rightward from a right portion of the center housing portion 53c. As a result, the right portion of the right front housing portion 53a is positioned in the vicinity of the lower portion of the right hinge pillar 43. Further, the left front housing portion 53b is formed so as to protrude leftward from a left portion of the center housing portion 53c. As a result, the left portion of the left front housing portion 53b is positioned in the vicinity of the lower portion of the left hinge pillar 43.

Further, the upper portion of the center housing portion 53c is positioned higher than the upper portions of the right front housing portion 53a, the left front housing portion 53b, the right rear housing portion 53d, and the left rear housing portion 53e. Since the center housing portion 53c is formed higher, the batteries 50 can be housed in the center housing portion 53c so as to form a plurality of stages in the up-down direction.

The batteries 50 are housed in the housing portions 53a to 53e in a similar manner. Thus, a space below the front floor panel 30, a space below the second floor panel 32, and the internal space of the floor tunnel portion 30c can be effectively used as spaces for housing the batteries 50, and the capacity for mounting the batteries 50 can be increased.

Since the right front housing portion 53a is positioned in the first battery arrangement portion 51, the internal space of the right front housing portion 53a is the first battery arrangement portion 51. Further, since the left front housing portion 53b is also positioned in the first battery arrangement portion 51, the internal space of the left front housing portion 53b is also the first battery arrangement portion 51. Since the center housing portion 53c is positioned in the second battery arrangement portion 52, the internal space of the center housing portion 53c is the second battery arrangement portion 52. As described above, the single battery case 53 includes the first battery arrangement portion 51 on the driver seat side, the second battery arrangement portion 52, and the first battery arrangement portion 51 on the passenger seat side.

Since the right front housing portion 53a and the right rear housing portion 53d are separated from each other in the front-rear direction, a space having no batteries 50 is formed between the right front housing portion 53a and the right rear housing portion 53d. This space can be used to lower the position of the front seat 8.

Although not shown in the figure, the first battery arrangement portion 51 may be provided inside in the vehicle width direction in the vicinity of the center pillar 45 (shown in FIG. 1) below the floor panel 30. Further, although not shown in the figure, the first battery arrangement portion 51 may be provided inside in the vehicle width direction in the vicinity of the rear pillar below the floor panel 30.

The structure, shape, etc. of the battery case 53 may be changed according to the type of battery 50. In the battery case 53, a cooling unit, a heating unit, etc. (both not shown in the figure) for adjusting the temperatures of the batteries 50 can be provided.

The lower portions of the first battery arrangement portions 51 and the second battery arrangement portion 52 may be at the substantially same height as that of the lower surface of the first floor panel 31 or at a position higher than the lower surface of the first floor panel 31 such that the minimum ground clearance of the motor vehicle 1 is not low. The lower portions of the first battery arrangement portions 51 and the second battery arrangement portion 52 may be lower than the lower surface of the first floor panel 31. As a result, the capacity for mounting the batteries 50 can be further increased.

(Posture of Front Seat Occupant and Pedal Operation)

Figure 8:
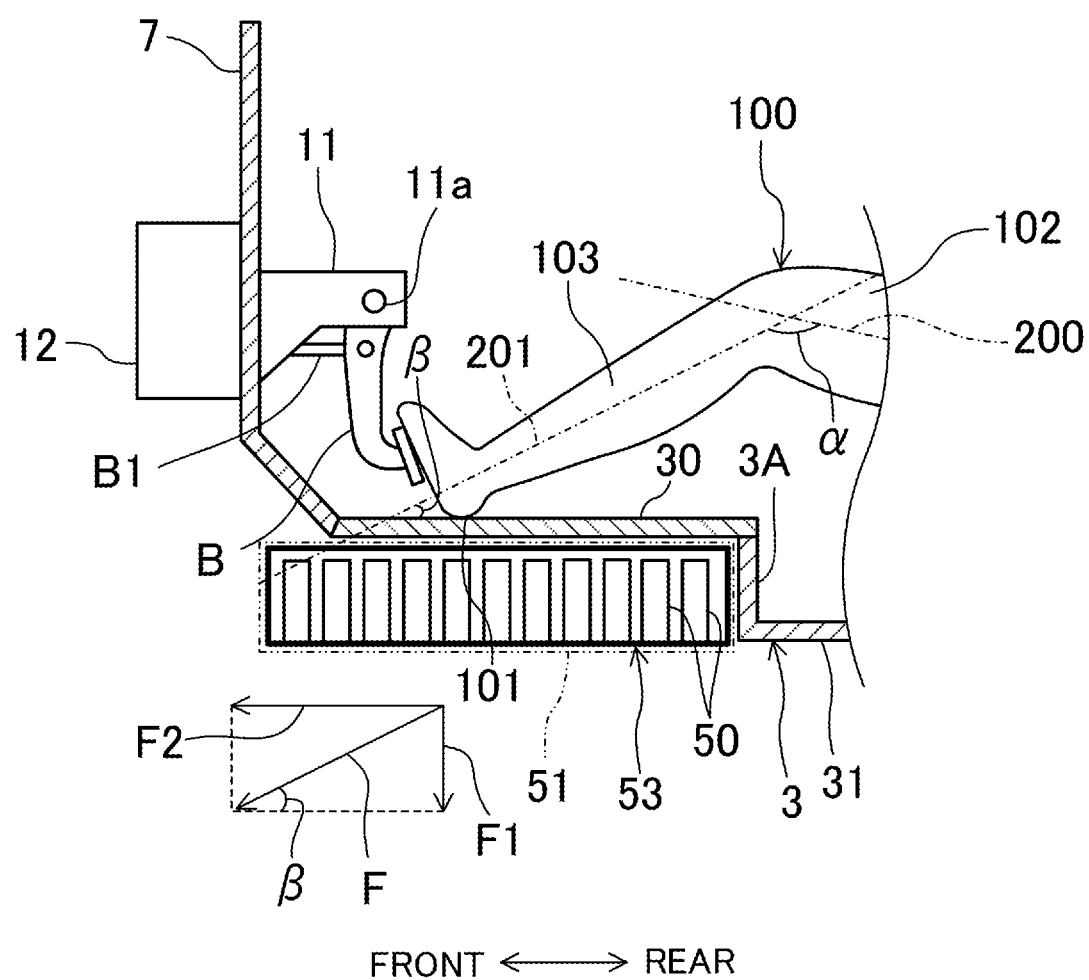
FIG. 8 is a view for describing pedal operation.

FIG. 8 is a view showing a lower limb 100 of the front seat occupant (a pedal operator) seated on the front seat 8, the floor panel 3, the dash panel 7, the brake pedal B, and the vicinity thereof. In this embodiment, the lower rear portion of the seat frame 8g of the front seat 8 is positioned lower than the upper surface of the front floor panel 30. Thus, the hip point of the pedal operator can be lowered. Lowering the hip point of the pedal operator means that the seating position of the pedal operator is lowered. This lowers the height of the center of gravity of the vehicle while the occupant is on-board.

Further, since the front floor panel 30 on which a heel 101 of the pedal operator is placed is positioned higher than the first floor panel 31, the heel 101 of the pedal operator is placed at a position higher as compared to a general operation posture. Such a layout leads to such a posture that an upper leg 102 and a lower leg 103 of the pedal operator are widely open. In FIG. 8, a reference numeral 200 indicates the center line of the upper leg 102 of the pedal operator whereas a reference numeral 201 indicates the center line of the lower leg 103, and a difference in a height between the front floor panel 30 and the first floor panel 31 is set such that an angle (an opening angle α between the upper leg 102 and the lower leg 103) between the center lines 200, 201 falls within a range of 125° to 150°.

Setting the height difference as described above results in a smaller angle (angle (3 between the center line 201 and the front floor panel 30) between the lower leg 103 and the front floor panel 30. This decreases component force, which is input to the heel 101 upon pedal operation, in the up-down direction, and improves the operability of the brake pedal B. More specifically, when the pedal operator steps on the brake pedal B, the heel 101 causes obliquely-downward force F to act on the front floor panel 30. When divided into vertical force and horizontal force, the force F is divided into force F1 and force F2. Since the angle β is small as described above, the component force F1, which is input from the heel 101, in the up-down direction is reduced. This allows, e.g., the quick and accurate operation of switching the pedal to be stepped on from the brake pedal B to the accelerator pedal A or from the accelerator pedal A to the brake pedal B. As a result, the operability of the pedals A, B is improved.

(Comfort of Rear Seat Occupant)

Note that this embodiment can improve the comfort of the rear seat occupant. As shown in FIG. 2, since the second floor panel 32 to which the rear seat 10 is attached is positioned higher than the first floor panel 31, the occupant on the rear seat 10 is seated at a relatively-high position, which improves the field of view. The feet of the rear seat occupant are placed on the first floor panel 31. Since the first floor panel 31 is positioned lower than the second floor panel 32, a wide foot space for the rear seat occupant is ensured particularly in the height direction.

(Features and Advantages of Embodiment)

As described above, according to this embodiment, the first battery arrangement portions 51 provided inside in the vehicle width direction in the vicinity of the hinge pillars 43 below the floor panel 3 and the second battery arrangement portion 52 provided at the center portion in the vehicle width direction below the floor panel 3 in the region inside in the vehicle width direction with respect to the outer portions of the first battery arrangement portions 51 in the vehicle width direction are provided. Thus, the capacity for mounting the batteries 50 below the floor panel 3 can be increased.

Further, the vicinity of the relatively highly-rigid hinge pillars 43 of the vehicle body is a portion having only a small amount of inward deformation in the vehicle width direction upon lateral collision, and the first battery arrangement portions 51 are provided inside the vicinity of the hinge pillars 43 in the vehicle width direction. Thus, the impact load input to the batteries 50 arranged in the first battery arrangement portions 51 is reduced. Further, since the second battery arrangement portion 52 is provided in the region inside the outer portions of the first battery arrangement portions 51 in the vehicle width direction and is away inward from the side sill 42 in the vehicle width direction, a long distance in the vehicle width direction between the second battery arrangement portion 52 and the side sill 42 can be ensured. Thus, even if the side sills 42 deform inward in the vehicle width direction upon lateral collision, the impact load input to the batteries 50 arranged in the second battery arrangement portion 52 is reduced.

OTHER EMBODIMENTS

The above-described embodiments are merely examples in nature in all respects, and the scope of the present disclosure should not be interpreted in a limited manner. Further, variations and modifications of equivalents of the patent claims are intended to fall within the scope of the present disclosure.

Figure 9:
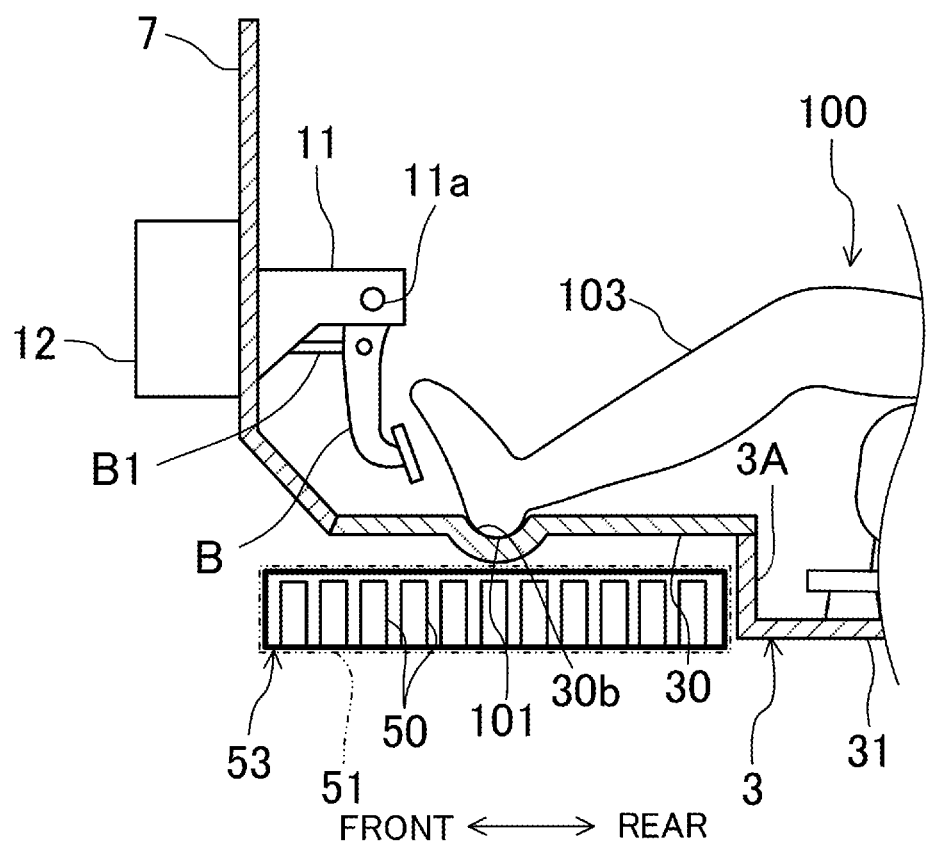
FIG. 9 is a view corresponding to FIG. 8, which relates to Variation 1 of the embodiment.

For example, in Variation 1 of the embodiment shown in FIG. 9, the front floor panel 30 has, at a portion corresponding to the brake pedal B, a recessed portion 30b for placing the heel 101 of the pedal operator. It may only be required that the depth of the recessed portion 30b is set so as to house at least part of a heel portion of a shoe, and the depth can be 2 cm or more or 3 cm or more, for example. Since the pedal operability might be degraded if the recessed portion 30b is extremely deep, the depth may be 7 cm or less, for example. The width (the dimension in the right-left direction) of the recessed portion 30b can be, for example, 5 cm or more or 7 cm or more.

With the recessed portion 30b, the heel 101 is less likely to shift in the right-left direction. This can make the foot stable in the case of turning a toe in the right-left direction about the vicinity of the heel 101, such as the case of stepping on the accelerator pedal A after having stepped on the brake pedal B, for example. As a result, the pedal operability can be further improved by a synergy effect with the above-described advantage of the small angle β between the lower leg 103 of the pedal operator and the front floor panel 30.

Figure 10:
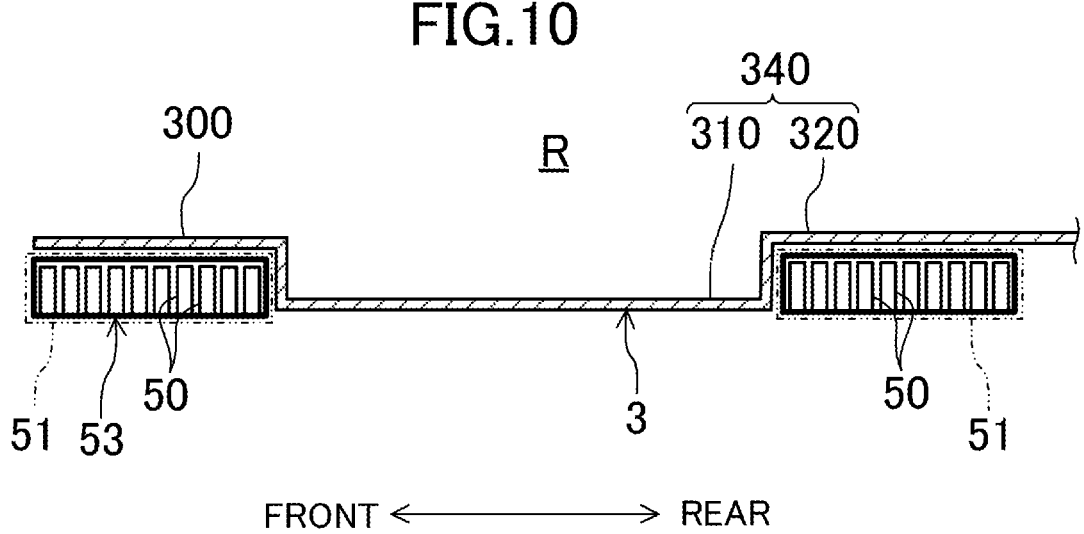
FIG. 10 is a view corresponding to FIG. 6, which relates to Variation 2 of the embodiment.

Further, as in, e.g., Variation 2 of the embodiment shown in FIG. 10, the floor panel 3 may be a single piece from the front portion to the rear portion. Specifically, the floor panel 3 of Variation 2 includes a front panel portion 300 for placing the heel of the pedal operator and a seat-mounted panel portion 340. The seat-mounted panel portion 340 is provided at the rear of the front panel portion 300, and includes a first panel portion (a rear panel portion) 310 to which at least the front seat 8 is attached and a second panel portion (a rear-seat panel portion) 320.

The first battery arrangement portions 51 can be arranged below the front panel portion 300, and the first battery arrangement portions 51 can also be arranged below the second panel portion 320. The front panel portion 300 is equivalent to the above-described front floor panel 30, the first panel portion 310 is equivalent to the above-described first floor panel 31, and the second panel portion 320 is equivalent to the above-described second floor panel 32. In Variation 2, features and advantages similar to those of the above-described embodiment can be also obtained. Alternatively, the front panel portion 300 and the first panel portion 310 may be integrally formed, and the second panel portion 320 may be a separate member. Alternatively, the second panel portion 320 and the first panel portion 310 may be integrally formed, and the front panel portion 300 may be a separate member.

As described above, the vehicle body structure of the present disclosure is applicable to a motor vehicle having a floor panel, for example.

What is claimed is:

1. A vehicle body structure of a motor vehicle including a floor panel forming a floor surface of a vehicle interior, a traction motor, and batteries that supply electric power to the traction motor, the vehicle body structure comprising:
- a pair of right and left side sills arranged to extend in a front-rear direction at both end portions of the floor panel in a vehicle width direction;
- a pair of right and left pillars each extending upward from the pair of right and left side sills;
- a first battery arrangement portion provided inside a vicinity of the pillars in the vehicle width direction below the floor panel such that the batteries are arranged therein; and
- a second battery arrangement portion provided at a center portion in the vehicle width direction below the floor panel such that the batteries are arranged therein,
- wherein a front seat is attached to a first floor panel of the floor panel where no battery is arranged and lower in height than other floor panels.

2. The vehicle body structure of claim 1, further comprising:
- a floor tunnel portion bulging upward at a center portion of the floor panel in the vehicle width direction, wherein
- the second battery arrangement portion is provided inside the floor tunnel portion.

3. The vehicle body structure of claim 2, wherein the first battery arrangement portion is provided outside the floor tunnel portion in the vehicle width direction.

4. The vehicle body structure of claim 1, wherein
- the first battery arrangement portion includes first battery arrangement portions arranged on both sides in the vehicle width direction with respect to the second battery arrangement portion, and
- the second battery arrangement portion and the first battery arrangement portions on both sides in the vehicle width direction are provided continuously in the vehicle width direction.

5. The vehicle body structure of claim 4, further comprising:
- a battery case housing the batteries and fixed to at least either one of the floor panel or the side sills,
- the single battery case includes one of the first battery arrangement portions on one side in the vehicle width direction, the second battery arrangement portion, and the first battery arrangement portion on the other side in the vehicle width direction.

6. The vehicle body structure of claim 1, wherein the floor panel includes
- a front floor panel for placing a heel of a pedal operator operating a pedal provided at the motor vehicle, and
- a rear floor panel provided at a rear of the front floor panel,
- the front floor panel is positioned higher than the rear floor panel, and
- the first battery arrangement portion is provided below the front floor panel.

7. The vehicle body structure of claim 2, wherein the floor panel includes
- a front floor panel for placing a heel of a pedal operator operating a pedal provided at the motor vehicle, and
- a rear floor panel provided at a rear of the front floor panel,
- the front floor panel is positioned higher than the rear floor panel, and
- the first battery arrangement portion is provided below the front floor panel.

8. The vehicle body structure of claim 3, wherein the floor panel includes
- a front floor panel for placing a heel of a pedal operator operating a pedal provided at the motor vehicle, and
- a rear floor panel provided at a rear of the front floor panel,
- the front floor panel is positioned higher than the rear floor panel, and
- the first battery arrangement portion is provided below the front floor panel.

9. The vehicle body structure of claim 4, wherein the floor panel includes
- a front floor panel for placing a heel of a pedal operator operating a pedal provided at the motor vehicle, and
- a rear floor panel provided at a rear of the front floor panel,
- the front floor panel is positioned higher than the rear floor panel, and
- the first battery arrangement portion is provided below the front floor panel.

10. A vehicle body structure of a motor vehicle including a floor panel forming a floor surface of a vehicle interior, a traction motor, and batteries that supply electric power to the traction motor, the vehicle body structure comprising:
- a pair of right and left side sills arranged to extend in a front-rear direction at both end portions of the floor panel in a vehicle width direction;
- a pair of right and left pillars each extending upward from the pair of right and left side sills;
- a first battery arrangement portion provided inside a vicinity of the pillars in the vehicle width direction below the floor panel such that the batteries are arranged therein; and
- a second battery arrangement portion provided at a center portion in the vehicle width direction below the floor panel such that the batteries are arranged therein,
- wherein the first battery arrangement portion is located below a front floor panel of the floor panel,
- the second battery arrangement portion is formed in a floor tunnel portion provided at a center portion of the floor panel in the vehicle width direction, and
- lower portions of the first battery arrangement portion and the second battery arrangement portion are at substantially a same height as a height of a lower surface of a first floor panel of the floor panel.

* * * * *